June 16, 1936.    L. BACK    2,043,977
EXERCISING DEVICE FOR USE IN CONNECTION WITH BICYCLES
Filed July 17, 1933    2 Sheets-Sheet 1

Inventor:
Leonard Back
By Charles A Warren
Attorney

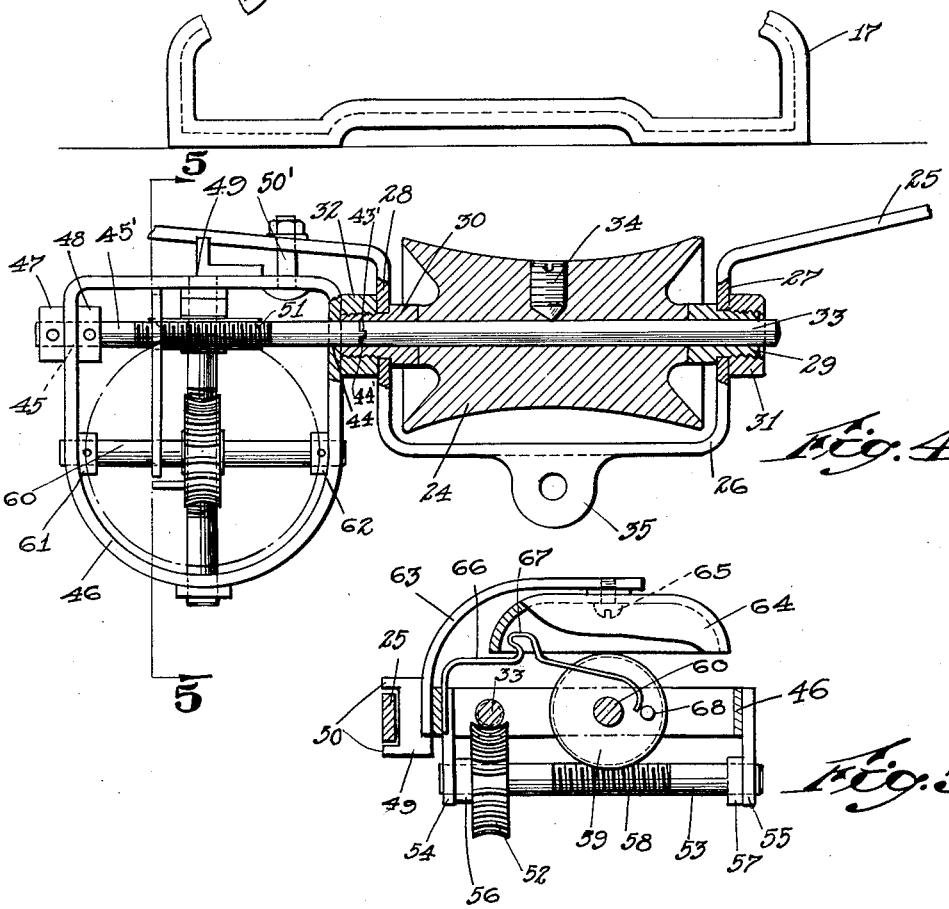

UNITED STATES PATENT OFFICE 2,043,977

EXERCISING DEVICE FOR USE IN CONNECTION WITH BICYCLES

Leonard Back, Fitchburg, Mass., assignor to Iver Johnson's Arms & Cycle Works, Fitchburg, Mass., a corporation of Massachusetts Application July 17, 1933, Serial No. 680,777

5 Claims. (Cl. 272—73)

The present invention relates to a device which is used in connection with a bicycle to provide for pedaling exercises without movement of the bicycle.

Prior stationary devices which provide for pedaling exercises involve a frame having handle bars, saddle and a crank with provision for applying a predetermined braking action to the crank. This type of machine not only occupies a large amount of space by reason of this construction but is also necessarily expensive. The principal object of the present invention is to provide a device which may be used in connection with the usual bicycle construction without materially altering the bicycle and without interfering with the use of the bicycle for ordinary riding purposes when the device is removed therefrom. The device is arranged to support a conventional bicycle in a stationary position with the rear wheel free to turn to provide for pedaling exercises, and the bicycle may readily be picked up from the device and the user may then ride it away.

Other and further objects and advantages of the invention will appear from the following detailed description taken in connection with the accompanying drawings in which:—

Fig. 3 is a fragmentary end elevation of the device, with parts broken away, showing the structure by which the rear wheel of the bicycle is supported.

Fig. 4 is a sectional view substantially along the line 4—4 of Fig. 2.

Fig. 5 is a sectional view substantially along the line 5—5 of Fig. 4.

Like reference characters refer to like parts in the different figures.

Figure 1:
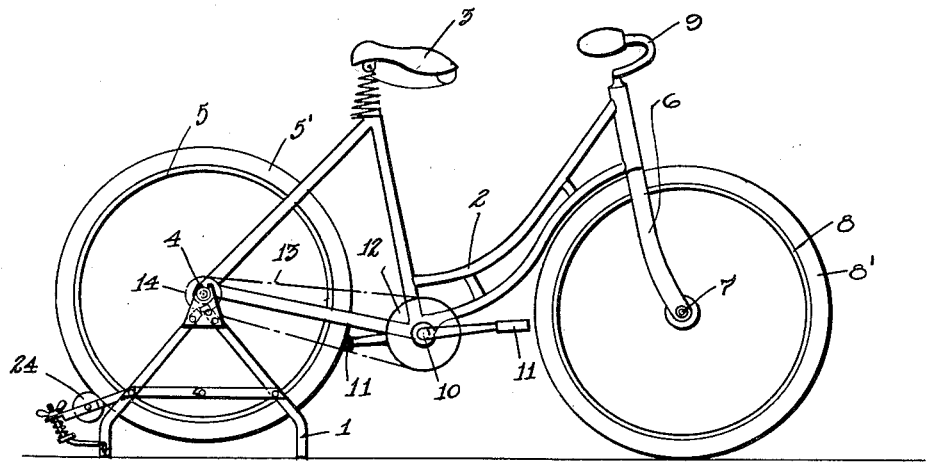
Fig 1 is an elevation of a device embodying the invention, showing its use in connection with a bicycle.

Referring first to Fig. 1, the device 1 is shown in connection with a bicycle of well-known construction; the latter has a frame 2 on which a saddle 3 is positioned and said frame supports a rear axle 4 on which the rear wheel 5 is journaled. The frame also supports a fork 6 in which the front axle 7 is positioned, the front wheel 8 being journaled on said axle, and the upper end of the fork 6 has handle bars 9 secured thereto to provide for steering of the vehicle. A crank 10 having oppositely extending pedals 11 is journaled in the frame and a sprocket 12 secured to said crank is connected by a chain 13 to a sprocket 14, Fig. 3, on the hub 15 of the rear wheel. The wheels 5 and 8 are preferably provided with pneumatic tires 5' and 8' respectively.

The device of the invention is arranged to support a bicycle of the type above described with the rear wheel thereof out of engagement with the surface on which the device and the front wheel of the bicycle rests, and with the frame of the vehicle in a substantially upright position so that said vehicle may be pedaled in the usual manner, without forward movement of said vehicle. At the same time, the device provides for retarding or braking the movement of the rear wheel 5 so that the effort necessary to pedal the vehicle may be varied and adjusted to the desired extent.

Figure 2:
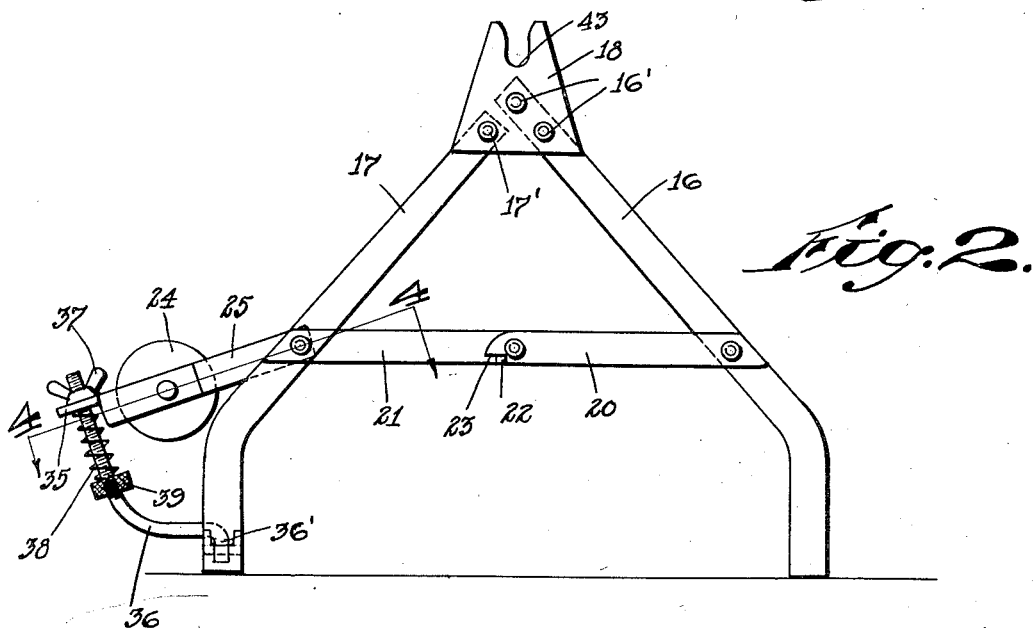
Fig. 2 is an elevation on a larger scale of the device of Fig. 1.

Referring to Fig. 2, the device of the invention comprises two substantially U-shaped supporting members 16 and 17 which have the ends thereof connected to plates 18 and 19, the latter being spaced apart a distance substantially equal to the length of the rear axle 4 of the bicycle. The member 16 is secured against turning movement on the plates as by bolts 16' and the member 17 is mounted for pivotal movement on said plates by bolts 17' to provide for folding of the device when not in use. The U-shaped members, which are channel-shaped in cross-section, are connected together by links 20 and 21, the link 20 being pivotally mounted on the member 16, and the link 21 being pivotally mounted on the member 17. Said links are also pivotally connected together in overlapping relation, as best shown in Fig. 2, and one of said links is provided with a projection 22 engaging in a notch 23 in the other of said links to prevent relative movement of said links beyond the position of Fig. 2. In folding the device, the pivotal connection of the links 20 and 21 is rocked upwardly toward the plates 18 and 19 to permit the members 16 and 17 to move toward each other, the member 17 pivoting on said plates.

The links 20 and 21, in the position of Fig. 2, support the members 16 and 17 in positions substantially at right angles to each other so that the bases of said members engage the supporting surface at spaced points. Furthermore, as best indicated in Fig. 3, the bases of the U-shaped members 16 and 17 are flat and broader than the spacing between the plates 18 and 19 to provide a firm support for said device on the supporting surface, thereby preventing the bicycle, when mounted in said device, from tipping over while in use.

As shown in Fig. 1, the tire on the rear wheel of the bicycle 5 engages a roller 24 on the device 1, said roller being arranged to retard the rotation of the wheel 5 for varying the effort necessary to pedal the bicycle. As shown in Figs. 2 and 4, an auxiliary frame member 25 which extends between the opposite legs of the U-shaped member 17 and is pivotally mounted thereon, has a rearwardly extending offset section 26 positioned centrally between the ends of said member. Said offset 26 provides parallel portions 27 and 28 which receive bearings 29 and 30 respectively, the latter being secured in position by clamping nuts 31 and 32 which engage threaded portions of the outer surface of said bearings and clamp said bearings against movement in said parallel portions. The bearings form journals for a shaft 33 on which the roller 24 is secured against rotation as by a set screw 34. The ends of the bearings 29 and 30 abut the opposite ends of the roller 24 to prevent axial movement of said roller relative to the auxiliary frame member 25.

As shown in Fig. 2, the offset section 26 of the member 25 has a projecting lug 35 through which a threaded rod 36 is slidable, and a wing nut 37, engaging the upper surface of the lug 25, is screwed on the rod 36. A coil spring 38 surrounds the rod 36 beneath the lug 35 and the lower end of said spring rests against a knurled nut 39 also engaging with the threads on the rod 36. The rod 36 below the nut 39 is bent forwardly and has a downwardly extending end 36' for engagement in an opening in the base of the U-shaped member 17. The amount of retardation of the rear wheel 5 of the bicycle is varied by adjusting the position of the lug 35 relative to the rod 36 by turning of the wing nut 37 and also by turning the nut 39, the latter adjustment serving to vary the pressure exerted by the spring 38 in urging the roller 24 against the tire on the wheel.

As above stated, the plates 18 and 19 engage the rear axle 4 or the frame of the bicycle to support the latter in substantially vertical position with the rear wheel 5 spaced from the supporting surface on which the device 1 rests. Referring now to Fig. 3, the rear axle 4, on which the hub 15 of the rear wheel is journaled, has positioned on the outer ends thereof, in the place of the usual locking nuts, a pair of special locking nuts 40 and 41, each of which is provided with an annular groove 42. Each of the plates 18 and 19 is provided with a notch 43 in the upper edge thereof, said notches having parallel edges, spaced apart a distance equal to the diameter of the grooves 42.

When the nuts 40 and 41, which form a part of the rear axle assembly are positioned on the rear axle of the vehicle, and the latter is positioned on the device with said nuts engaging the plates 18 and 19, said plates are supported against axial movement on the rear axle of the bicycle and said bicycle is accordingly supported by the device in the proper upright position. As indicated in Fig. 2, the notches 43 are widened somewhat at their upper ends to provide for easy insertion of the nuts 40 and 41 therein.

The device may be provided with a means for determining the distance which the bicycle is pedaled. To this end, the left hand end of the shaft 33 within the bearing 30 is provided with a groove 43' which is adapted to receive a tongue 44' on the end of a shaft 45'. The latter is coaxial with the shaft 33, Fig. 4, and projects through openings 44 and 45 in spaced portions of a frame 46. The shaft 45' has collars 47 and 48 pinned thereto on opposite sides of one of the portions of the frame 46 to support the latter against axial movement on the shaft. Said frame has a lug 49 which is formed with spaced projections 50 extending on opposite sides of a portion of the auxiliary frame member 25 to support the frame 46 against turning movement on the shaft 45'. The frame 46 is also held in position by a bolt 50' extending through said frame and through the frame member 25. Said shaft 45' has a portion thereof formed as a worm 51 which engages a worm gear 52 on an auxiliary shaft 53 journaled in depending brackets 54 and 55, Fig. 5, on the frame 46. Spaced collars 56 and 57 on the shaft 53 support the latter against axial sliding movement in the depending brackets. The shaft 53 has a portion forming a worm 58 which engages with a worm gear 59 on a shaft 60 journaled in the frame 46 in parallel relation to the shaft 33. The shaft 60 is supported against axial movement in said frame by spaced collars 61 and 62.

As best shown in Fig. 5, an arm 63 is secured to and extends upwardly and forwardly from a part of the frame 46 in overlying relation to the worm gear 60. The free end of said arm supports a bell 64 secured to said arm by a screw 65. A wire 66, having one end secured to the frame 46, has a rebent portion positioned for engagement with the bell 64 adjacent the edge thereof, said portion forming a hammer 67 for the bell. From the hammer 67, the wire extends adjacent to and in spaced relation to the worm gear 59 in a position to engage with a pin 68 secured to and projecting laterally from the gear 59. As the gear 59 rotates clockwise in response to rotation of the roller 25, the latter turning as a result of the pedaling of the bicycle, the pin 68 is advanced therewith and ultimately elevates the free end of the wire 66. As the pin 68 passes beyond the end of the wire 66, the latter is suddenly released and the movement thereof, through the resiliency of the wire, causes the hammer 67 to strike the bell. The ratio of the several gears and worms, above referred to, is such that the bell is struck once for each mile, or other predetermined distance, that the rear wheel 5 of the bicycle has traveled relative to the roller 24. It will be apparent that the device for determining the distance that the rear wheel turns is readily removable from the frame member 25, and is thus an auxiliary structure to be used when desired.

From the foregoing, it will be apparent that the present invention involves a device by which an ordinary bicycle may be adapted for pedaling exercises without movement of the bicycle as a whole; that is, the bicycle is mounted in a fixed position and pedaled without movement from that position. The invention further provides for varying the effort necessary in pedaling the bicycle and also has an auxiliary structure by which the distance pedaled may be determined.

I claim:

1. The combination with a bicycle having a frame, a rear axle secured to said frame, a wheel journaled on said axle, and nuts on the opposite ends of said axle having annular grooves therein, of a supporting frame having notches therein for engagement with the annular grooves in said nuts for supporting the bicycle with its rear wheel spaced from the surface on which said supporting frame and bicycle rest.

2. The combination with a bicycle having a frame, a rear axle secured to said frame, a wheel journaled on said axle, and nuts on the opposite ends of said axle having annular grooves therein, of a supporting frame having notches therein for engagement with the annular grooves in said nuts for supporting the bicycle with its rear wheel spaced from the surface on which said supporting frame and bicycle rest, said supporting frame having means for applying a braking action to the wheel.

3. The combination with a bicycle having a frame, a rear axle secured to said frame, a wheel journaled on said axle and nuts on the opposite end of said axle, of a supporting frame having a portion thereof engageable with said nuts for supporting the bicycle with its rear wheel spaced from the surface on which said supporting frame and bicycle rest, said frame and nuts having co-operating means to prevent axial movement of said supporting frame relative to said rear axle.

4. The combination with a bicycle having a frame, a rear axle secured to said frame, a wheel journaled on said axle and nuts on the opposite end of said axle, of a supporting frame having a portion thereof engageable with said nuts for supporting the bicycle with its rear wheel spaced from the surface on which said supporting frame and bicycle rest, said frame and nuts having co-operating means to prevent axial movement of said supporting frame relative to said rear axle, and a roller engageable with the rear wheel for applying a braking action to said wheel.

5. A device for use with a complete bicycle to permit pedaling of the bicycle in a stationary position, said bicycle having nuts on the opposite ends of said axle with grooves therein, said device comprising a supporting frame formed from a pair of U-shaped members, a pair of notched plates, the notches in said plates being engageable with the grooves in the nuts on the rear axle of the bicycle, one of said members being permanently secured to said plates and the other of said members being pivotally secured to said plates, links connected to said members for supporting said members in spaced relation, an auxiliary frame pivoted on one of said members and a roller rotatably supported by said auxiliary frame and engageable with the rear wheel of the bicycle for a braking action thereon.

LEONARD BACK.